United States Patent
Lindner

[11] 3,910,602
[45] Oct. 7, 1975

[54] MEANS FOR STORING BICYCLE SECURITY CABLE

[76] Inventor: Henry Lindner, 262 Welter Dr., Wood Dale, Ill. 60191

[22] Filed: Apr. 12, 1974

[21] Appl. No.: 460,304

[52] U.S. Cl.................. 280/289; 70/233; 224/30 R
[51] Int. Cl.²...................... B62J 39/00; B62H 5/00
[58] Field of Search ...... 280/289; D12/119; 70/233, 70/234, 235, 236; 180/114; 224/30 R

[56] References Cited
UNITED STATES PATENTS
2,248,971  7/1941  Duffy................................ 280/289

FOREIGN PATENTS OR APPLICATIONS
539,919  11/1931  Germany ............................. 70/234
625,711  1/1936  Germany ............................. 70/234
876,220  3/1953  Germany ............................. 70/234
262,047  1/1929  Italy..................................... 280/289
744,336  11/1943  Germany ............................. 70/233

Primary Examiner—David Schonberg
Assistant Examiner—John P. Silverstrim
Attorney, Agent, or Firm—Dominik, Knechtel, Godula & Demeur

[57] ABSTRACT

A bicycle seat assembly in which a port is present in the tubular post of the seat member to receive a folded, flexible cable for storage within the passageway of the tubular post and the tubular frame part of the bicycle in which the tubular post is telescopically mounted. The opposite ends of the stored, folded cable are secured to a locking location on the underside of a seat member by a lock.

6 Claims, 3 Drawing Figures

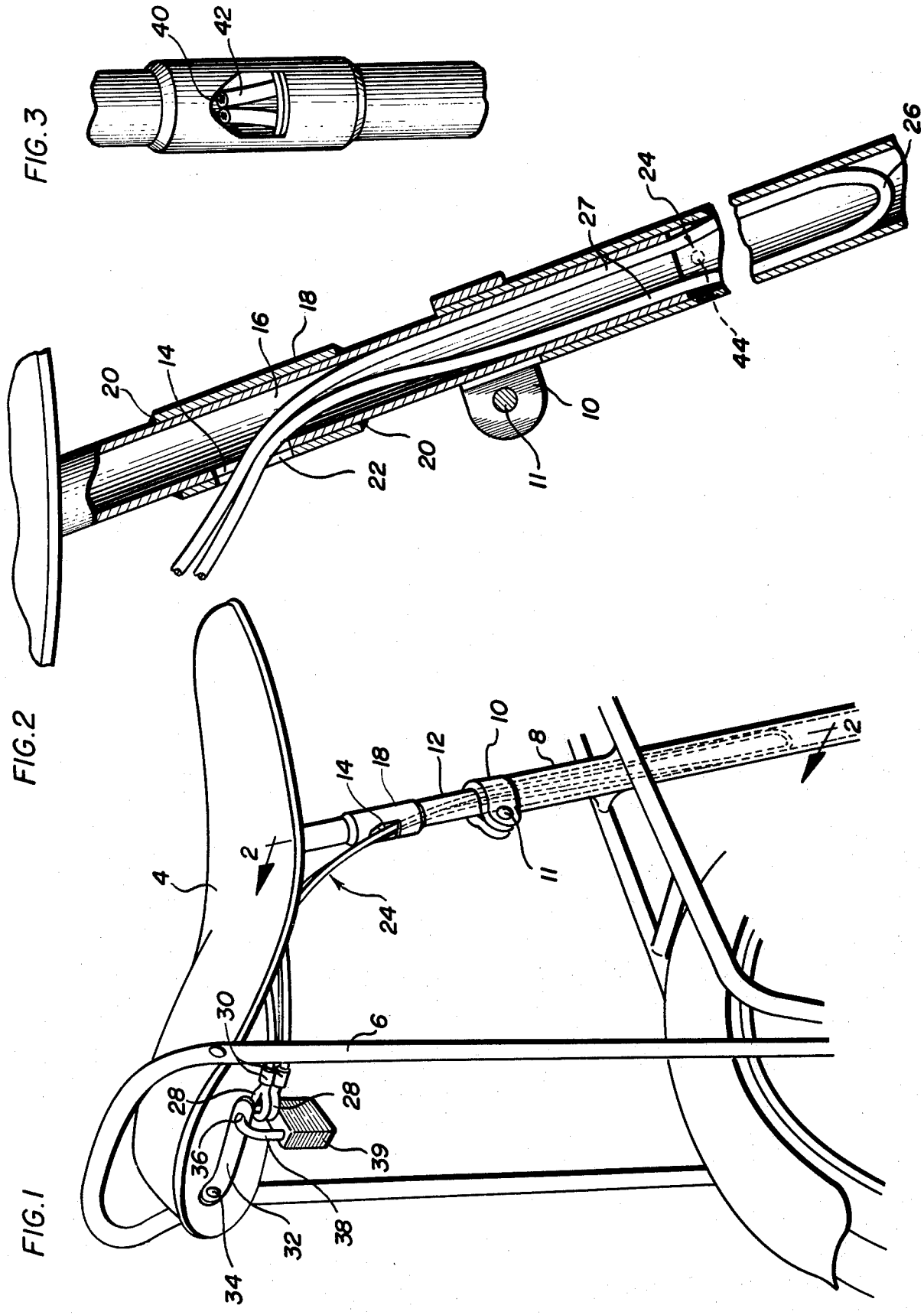

MEANS FOR STORING BICYCLE SECURITY CABLE

This invention relates to improved locking means for a bicycle; and particularly relates to an improved assembly for storing an elongated, flexible locking member so the locking means may be more efficiently handled and used.

Bicycles are secured from theft by the almost universal means of wrapping a link chain around a bicycle frame part and some anchoring structure such as a post; and then locking the opposite ends of the chain structure by a lock. Such chains have been covered with tubular rubber or plastic to prevent damage to the bicycle. Such locking chains are stored or carried by wrapping around the tubular post of the seat member and then securing the opposite ends with the lock to a conventional looped structure, such as a turn of a spring, present on the underside of the seat member. Such chains have also been wrapped around other parts of the bicycle frame, but the disadvantages of bulkiness, rattling, and general inconvenience of storage and handling remain as problems.

An object of the present invention is to provide a bicycle seat assembly with improved locking means for use in storage.

Another object of the present invention is to provide an improved bicycle seat assembly in which a flexible, elongated locking member may be quickly stored in a highly convenient way, and which can further be quickly activated for securing the bicycle to an anchoring structure.

Yet another object is an improved bicycle seat assembly having locking means which can be extended from storage quickly to be secured to an anchoring structure by only joining the opposite free ends of an elongated, flexible locking member, the opposite fold end of the locking member being intercepted by a fixed stop in a bicycle frame part.

Still another object is an improved seat member assembly with locking means that utilize a lighter and smaller dimensioned elongated locking member of sufficient physical strength to discourage theft, yet allowing improved storage and handling.

Such objects are achieved together with still other objects of advantage which will become apparent from considering the following disclosure of the invention, including drawings wherein:

FIG. 1 is a perspective view showing the improved seat assembly and locking means, with a portional view of associated bicycle part members;

FIG. 2 is a sectional view along line 2—2 of FIG. 1, on an enlarged scale; and

FIG. 3 is a rear elevational and portional view of a tubular post of the bicycle seat member, and further showing the elongated cable partly in section.

Looking now at the drawings, the view of FIG. 1 illustrates an elongated seat 4 of the banana type. The back of the seat is supported by an elongated U-bracket 6 which is fixed at its bottom ends to the wheel axel, such not being shown. Another illustrated part of the bicycle is a tubular frame part 8 fitted at the top with a clamping member 10 that is tightened in the usual way by a bolt fastener 11.

The seat member 4 is further supported by a tubular post 12 which telescopically engages tubular frame part 8, and is fixed by clamping member 10.

The tubular part is provided with a port 14 which provides communication with tubular passageway or storage area 16 of the tubular post.

The presence of the port understandably reduces the structural rigidity of the tubular post so provision is made for an enlargement in the post adjacent the port, shown as reinforcing collar 18. The collar is provided with a port 22 which is in registry with post port 14. The collar is secured to the tubular post by a plurality of welds 20.

The port 14 is sufficiently large to receive an elongated and flexible locking member 24 in folded condition. The folded condition of the locking member results in an end fold 26 and arms 27 of the folded body portion. The opposite free ends of the body portion are provided with an end loop 28 formed by the ends being looped and secured by fastening means shown as binding straps 30. Such straps can be locking collars, or clamps, or similar binding means.

The underside of the seat member is provided with a locking location shown as the lock holder element or bracket 32. One end of the bracket is fastened to the underside of the seat by means such as a rivet 34. The other end of the bracket is provided with a looped locking structure shown as a bracket aperture 36. A lock clasp or shackle 38 of lock 39 engages aperture 36 and looped ends 28 to hold the elongated locking member in storage condition. In such storage condition, a major length of the body portion passes through the passageway of tubular post 12 and is stored in the common passageway of post 12 and tubular frame part 8. The minor portion of the length extends out of port 14 to the locking location on the underside of the seat member.

The flexible, elongated locking member may be of various constructions so long as it has physical characteristics of strength and size to discourage theft when it operatively secures the bicycle to an anchoring structure. A preferred form includes a body of braided steel 40 covered with a plastic sheath 42. The plastic covering both protects the braided steel and provides smoother and easier handling in moving the cable through the tubular post port.

The elongated flexible member may be withdrawn completely from the tubular passageway or storage area, and then be wrapped around some part of the bicycle frame as well as around the anchoring structure. In another form, the end fold 26 of the locking member may be held within the tubular passageway 10 of part 8 by providing a fixed intercepting means such as stop pin 44 indicated in dotted outline in the view of FIG. 2. The opposite ends of the stop pin may be fixed in opposite tubular wall portions of the tubular frame part 8 by various means which, however, are not shown. Such means may include aligned bores in the tubular wall portions which receive the opposite ends of the closely fitting stop pin. Brazing or the like may be provided to securely hold the pin in such aligned bores. Nut and bolt assemblies through aligned bores may also be used. If desired, the stop pin may be mounted in the tubular post 12 of the seat assembly. Such a pin would preferably be positioned below and proximate to the port 14.

While the banana type of seat has been illustrated and described relative to the improved seat assembly and locking device, it should be understood that other types of bicycle seats can be used including those provided with various leaf or coil springs. Such springs or other looped structures can be used as the locking locations for the looped ends 38 and lock 39 in storage condition.

The claims of the invention are now presented and the terms of such claims should be further understood in view of the language of the preceding specification and the views of the drawings.

What is claimed is:

1. In a bicycle seat assembly having a tubular bicycle frame part, a tubular post mounted in said frame part, and a seat member mounted on said tubular post, the inprovement comprising a port in said tubular post, an enlarged tubular portion around said post, a port in said tubular portion in registry with said tubular port, a flexible elongated member having a fold, said fold extending through said port into the passageway of said tubular post and means for holding the opposite ends of said flexible member in releasable locking engagement on the underside of said seat member.

2. In a bicycle seat assembly as claimed in claim 1, the improvement further comprising a stop pin in the passageway of said frame part, said stop pin being positioned below and proximate to the tubular port, and said stop pin having opposite ends fixedly supported by opposite tubular wall portions of said frame part, said fold extending around said pin whereby said fold of said flexible member is intercepted by the pin when said member secures the bicycle to an anchoring structure.

3. In a bicycle seat assembly as claimed in claim 1, said flexible member comprising an elongated cable, and said opposite ends of said cable comprising locking loops, the improvement further comprising a locking shackle for locking said loops to said means for holding.

4. In a bicycle seat assembly as claimed in claim 3 said elongated cable being formed from braided steel covered with a plastic sheath.

5. In a bicycle seat assembly as claimed in claim 14, the improvement further comprising a stop pin in the passageway of said tubular frame part, and said stop pin having opposite ends fixedly supported by opposite tubular wall portions of the tubular frame part, whereby the elongated flexible member can be folded around said pin so the fold of the flexible member is intercepted by the pin when said member secures the bicycle to an anchoring structure.

6. In a bicycle seat assembly as claimed in claim 3, said means for holding comprising a bracket element fixed to the underside of said seat member, said bracket element having a locking aperture for receiving said shackle.

* * * * *